US012234992B2

(12) United States Patent
Rausch et al.

(10) Patent No.: US 12,234,992 B2
(45) Date of Patent: Feb. 25, 2025

(54) COOKING APPLIANCE WITH SPECIFIC LOCKING APPARATUS FOR A DOOR, ALSO METHOD

(71) Applicant: BSH Hausgeräte GmbH, Munich (DE)

(72) Inventors: Thorsten Rausch, Karlsruhe (DE); Kerstin Sickert, Bretten (DE); Martin Brunner, Pforzheim (DE); Michael Essert, Östringen (DE)

(73) Assignee: BSH Hausgeräte GmbH, Munich (DE)

( * ) Notice: Subject to any disclaimer, the term of this patent is extended or adjusted under 35 U.S.C. 154(b) by 475 days.

(21) Appl. No.: 17/690,044

(22) Filed: Mar. 9, 2022

(65) Prior Publication Data

US 2022/0307699 A1 Sep. 29, 2022

(30) Foreign Application Priority Data

Mar. 23, 2021 (DE) ........................ 102021202844.6

(51) Int. Cl.
*F24C 15/02* (2006.01)
*E05D 3/18* (2006.01)
*F24C 15/04* (2006.01)

(52) U.S. Cl.
CPC .............. *F24C 15/023* (2013.01); *E05D 3/18* (2013.01); *F24C 15/026* (2013.01); *F24C 15/045* (2013.01)

(58) Field of Classification Search
CPC ... E05D 15/582; E05D 3/18; E05D 2015/586; E05Y 2900/308
See application file for complete search history.

(56) References Cited

U.S. PATENT DOCUMENTS

| | | | | |
|---|---|---|---|---|
| 2013/0101904 | A1 | 4/2013 | Onozaki | |
| 2019/0271474 | A1* | 9/2019 | Grobleben | E05F 1/1276 |
| 2020/0378613 | A1 | 12/2020 | Dankwardt | |

FOREIGN PATENT DOCUMENTS

| | | | |
|---|---|---|---|
| DE | 7915089 | U1 | 9/1979 |
| DE | 10208473 | A1 | 9/2003 |
| DE | 102008010498 | A1 | 8/2009 |
| DE | 102018201950 | A1 | 8/2019 |
| WO | 2015185631 | A1 | 12/2015 |

OTHER PUBLICATIONS

National Search Report DE 102021202844.6 dated Nov. 28, 2021.
National Search Report EP 22 16 0321 dated Jul. 15, 2022.

* cited by examiner

*Primary Examiner* — Ko-Wei Lin
(74) *Attorney, Agent, or Firm* — Michael E. Tschupp; Andre Pallapies; Brandon G. Braun

(57) ABSTRACT

A cooking appliance includes a housing having a cooking chamber, a door, and a guide apparatus with a locking apparatus, which can lock the coupled state between the door and the guide apparatus. The locking apparatus has a bearing support with a holder, in which in the coupled state a bearing element engages. The locking apparatus has a tubular sleeve with a carrier, which is supported rotatably on the bearing support, so that in the coupled state when the sleeve is in a first rotational position, an unlocking position can be established between the sleeve and the bearing element and in the coupled state when the sleeve is in a second rotational position, a locking position can be established between the sleeve and the bearing element.

18 Claims, 8 Drawing Sheets

COOKING APPLIANCE WITH SPECIFIC LOCKING APPARATUS FOR A DOOR, ALSO METHOD

CROSS-REFERENCES TO RELATED APPLICATIONS

This application claims the priority of Spanish Patent Application, Serial No. P201830008, filed Jan. 8, 2018, pursuant to 35 U.S.C. 119(a)-(d), the disclosure of which is incorporated herein by reference in its entirety as if fully set forth herein.

BACKGROUND OF THE INVENTION

The invention relates to a cooking appliance and to a method for fitting a door of a cooking appliance.

Cooking appliances, such as an oven or a steam cooking appliance or a microwave cooking appliance, have doors, which close a cooking chamber at the front. Many different embodiments of these are known, in which the door can only be pivoted about a pivot axis arranged in a fixed position, which can also be moved into the housing of the cooking appliance and therefore into the stowage space during the opening movement. In the moved-in end position the door is then arranged at least half, in particular at least 70 percent, in particular at least 80 percent in the stowage space.

It is also known for such doors that corresponding space is required in the structure for such stowage space, so that such an inward and outward movement can be performed continuously and reliably. In the case of wide doors provision is therefore made for the design of specific space configurations for the stowage space on the one hand and specific configurations for the guide apparatus on the other hand.

BRIEF SUMMARY OF THE INVENTION

It is an object of the invention to create a cooking appliance and a method, in or with which the locked state of the door, which is coupled to a guide apparatus outside the door, can be reliably established.

The object is achieved by a cooking appliance and a method according to the independent claims.

One aspect of the invention relates to a cooking appliance with a housing. The cooking appliance also has a cooking chamber. This is configured in the housing. The cooking appliance also has a door for closing the cooking chamber. The cooking appliance has a guide apparatus, which guides the door as it is moved. The cooking appliance also has a coupling facility, which couples the door to the guide apparatus outside the door. For this purpose a non-destructively releasable coupling is configured between the door and the guide apparatus outside the door. The releasable connection is the interface between the door and the guide apparatus. The coupling facility has a locking apparatus, which can lock and unlock the coupled state between the door and the guide apparatus. The locking apparatus has a bearing support with a holder outside the door. The door has a bearing element. This is provided so that when the door and the guide apparatus are in the coupled state, the bearing element engages in the holder of the bearing support.

The locking apparatus has a tubular sleeve arranged outside the door. This means that the sleeve is not arranged on the door itself. The sleeve is supported rotatably on the bearing support. In the coupled state the sleeve can be arranged in an unlocking position in a first rotational position. An unlocked state is then established between the sleeve and the bearing element and therefore the locking apparatus. When the bearing element and the bearing support are in the coupled state the sleeve can be arranged as required in a different rotational position. This second rotational position is a locking position. This results in a locking position between the sleeve and the bearing element and therefore the locking apparatus. The sleeve has at least one carrier. The carrier means that when the door is moved, the carrier is automatically brought into contact with a contact element of the door or a contact element of the guide apparatus. The carrier is also arranged and configured so that after contact has been made, when the door is moved further, the sleeve is coupled to the door for movement purposes and can be rotated automatically from the unlocking position to the locking position. In an alternative embodiment provision is made, when the door is moved, for the carrier to be brought into contact automatically with a contact element outside the door, specifically a contact element of the guide apparatus. From this contact state, when the door is moved further, the sleeve can be rotated automatically from the unlocking position to the locking position or can be rotated into the corresponding locking position due to the movement of the door relative to the coupling element.

The invention provides a design, with which the locked state between the bearing element and the bearing support can be established automatically in a reliable manner by the sleeve. It is not necessary for a user or fitter to grip the sleeve directly and rotate it from the unlocking position to the locking position. As this can sometimes be forgotten during the fitting operation and the unlocking position then remains permanently, the invention counteracts it. The automatic establishing of the locking position means that the establishing of the locked state can no longer be omitted. Such automatic establishing can be achieved particularly easily and reliably with the proposed design. No more extensive mechanical chains of action are required. Instead only the door has to be moved, in order then directly to bring about the resulting indirect automatic simultaneous displacement of the sleeve from the unlocking position to the locking position. As the sleeve is a part that is outside the door, it is no longer necessary to have complex mechanical designs on the door itself, to bring about such indirect mechanical actuation of an element arranged on the door itself, as is the case for example in the prior art with the protrusion. The displacement of an element, which allows locking and is formed in the invention by the sleeve, no longer takes place on the door but is moved outside it. No complex mechanical action principles therefore have to be established in the door itself, transmitting movement of an element to an element associated with the locking apparatus, as is the case in the prior art.

The structure of the door itself can therefore be much simpler.

In one exemplary embodiment provision can be made for the bearing element to be arranged in a fixed position on the door. As it no longer has to be moved, it also makes the structure of the door simpler. Displacement of the element that has to be moved relative to other components to establish the locked state outside the door also means that the locking apparatus can be configured in a simpler manner. It also creates a very reliable mechanism for establishing the actually locking state.

Such a sleeve is also a component that can be built in a mechanically robust manner on other components, in this instance the bearing support. This also results in mechanically stable support for the rotatable part, specifically the sleeve. Corresponding force effects can be better absorbed and damage to the individual parts can be better avoided. Not least the bearing support is also a mechanically stable part, which allows the sleeve, which can be rotated relative thereto, to be supported in reliable and stable manner. As the bearing support is therefore also the direct support for the sleeve, and also comprises the holder, in which the bearing element of the door is to engage, a very local and compact locking system is possible.

In one exemplary embodiment the carrier can be arranged in a movement path of the door, so that when the door pivots, the carrier is automatically brought into contact with a contact element of the door and when the door pivots further, the sleeve is coupled to the door for movement purposes and can be rotated automatically from the unlocking position to the locking position. This action concept of the specific positioning of the carrier in the movement path also results in a particularly reliable action concept, as actual contact with the carrier can be achieved when the door is moved into the respectively desired position, thereby ensuring that corresponding contact between the contact element and the carrier is neither too early nor too late. It also means that with the contact between the carrier and the contact element, when the door is moved further, the sleeve starts to rotate immediately, in association with the rotational movement of the door.

In one exemplary embodiment the sleeve can have a circumferential wall. The circumferential wall has an outer face. The circumferential wall can be configured around the rotation axis of the sleeve. The carrier can extend radially outward from the circumferential wall, in particular from the outer face, and therefore in a plane perpendicular to the rotation axis. In particular the carrier can be oriented so that it cantilevers freely in this direction. This results in a very advantageous coupling concept between the carrier and the contact element of the door.

In a further exemplary embodiment the sleeve can have a circumferential wall. The circumferential wall has an outer face. The circumferential wall can be configured around the rotation axis of the sleeve. The carrier can extend axially from the circumferential wall. This means that it is configured some distance from the circumferential wall in the direction of the rotation axis. In particular the carrier can be arranged so that it cantilevers freely in the axial direction. This also results in advantageous coupling. In particular the exemplary embodiment is advantageous when a contact element of the guide apparatus is to be brought into contact with the carrier, in particular directly. The axially oriented carrier can then engage in a configuration of a contact element of the guide apparatus configured to the side in the widthwise direction of the cooking appliance. When the door is moved, a corresponding coupling results and a contact position is reached as a result of the fixed contact element of the guide apparatus and the carrier moving relative thereto. From this direct contact position the rotational movement of the sleeve can be generated automatically when the door is moved further as a result of the fixed contact element of the guide apparatus.

The abovementioned orientation of the carrier in a radial direction, as set out in the further exemplary embodiment, is advantageous in particular when the contact element is arranged directly on the door and its movement is therefore coupled directly to that of the door and direct contact between the contact element on the door and the carrier results when the door pivots.

In one exemplary embodiment a rotation axis of the sleeve, about which the sleeve can rotate relative to the bearing element, is parallel or coaxial to a pivot axis, about which the door can pivot relative to the guide apparatus. The rotation axis can be oriented in particular in the widthwise direction of the cooking appliance.

In one exemplary embodiment the holder in the bearing support can have a radially outer end. A radial opening can be configured on this radially outer end. The holder is therefore open in the radial direction. The bearing element of the door can be inserted into the holder through the opening. This results in particular in a linear insertion. Such a concept allows the door, which is still decoupled from the guide apparatus, to be coupled easily to the guide apparatus. Movement can also be guided very simply. Provision can be made in particular for the decoupled door to be arranged in an oblique position at an angle to the vertical. This can be an oblique fitting position or a coupling fitting position. In this oblique position the door can be moved linearly in the direction of the holder and the bearing element can then pushed linearly into the holder by way of the opening in the holder. This results in a basic coupling state. In this state the locking apparatus is however not yet locked. Rather the sleeve is in the unlocking position. This is also true of the state, in which the bearing element is not yet inserted into the holder in the bearing support. From this basic coupling state the sleeve can then be rotated into the locking position by way of the scenario described above.

In one exemplary embodiment the sleeve has a circumferential wall. An only partially circumferential cutout is configured herein. In the locking position the cutout is arranged in the same location as the opening in the holder when viewed in an azimuthal direction about the rotation axis of the sleeve, so that the opening is uncovered in a radial direction. This allows simple insertion of the bearing element into the holder. This peripherally open aperture in the circumferential wall also means the sleeve can have a geometrically simple structure.

In one exemplary embodiment the sleeve can have a circumferential wall, in which an only partially circumferential cutout is configured. When the sleeve is in the locking position on the bearing support, the cutout in the sleeve can be arranged with an offset from the opening when viewed in an azimuthal direction about the rotation axis of the sleeve, so that the opening is closed by the circumferential wall in a radial direction and the bearing element is locked in the holder to prevent it moving radially out of the opening. The circumferential wall therefore forms a cover or closing wall for the holder at the radially outer end. This means that the bearing element can no longer be removed radially from the holder. This results in a very simple locking concept, which can still be highly functional and reliable.

In one exemplary embodiment the bearing element can be arranged in a fixed position on the door. Therefore in the exemplary embodiment the bearing element can be positioned on the door in such a manner that it cannot be rotated or displaced. To couple the door to the guide apparatus outside the door it is only possible to insert the bearing element when the door is in a first oblique position, which can also be referred to as the coupling fitting position. The coupling fitting position is different from the fully opened position of the door and different from the fully closed position of the door. In the coupling fitting position of the door the door, in particular the abovementioned contact element, which is provided as required to be brought into contact with the carrier, is arranged some distance from the carrier in an azimuthal direction about the rotation axis of the sleeve. Quite specific positions of the door are therefore defined, in which only the basic fitting and insertion of the bearing element into the holder of the bearing support are possible. Only one such coupling fitting position is therefore possible here. In this the structure of the locking apparatus as required is then also such that the contact element is arranged some distance from the carrier in the circumferential direction about the rotation axis. On the one hand this means that during the essential fitting of the door to the bearing support unwanted rotational movement of the sleeve cannot be initiated, even if the contact element were to be brought into contact with the carrier immediately. This avoids unwanted splaying or jamming and a more complex fitting scenario.

In one exemplary embodiment a contact position of the door, which is different from the first oblique position and in which the carrier has just been brought into mechanical contact with the contact element or such contact is just taking place, is a position that is different from the fully opened position of the door and different from the fully closed position of the door. This also means that further movement of the door is possible from this contact state that has been established between the contact element and the carrier. This is advantageous in order to initiate the abovementioned automatic concept of establishing the locking position by moving the door. Because from this contact position, in which the contact element has just been brought into contact with the carrier, further movement of the door is possible, automatic rotation of the sleeve from the unlocking position to the locking position can also be reliably achieved on this further movement path.

In one exemplary embodiment the contacting or contact position can be a second oblique position of the door.

The contact position can be a second oblique position of the door, in which the door is opened further in relation to the vertical than in the first oblique position. The contact position can also be a second oblique position, in which the door is opened less far in relation to the vertical than in the first oblique position. This means that the door can be pivoted or moved from the first oblique position in the direction of the fully opened position in order to bring about the automatic establishing of the locking position of the sleeve. In another exemplary embodiment the door can be moved from the first oblique position toward the closed position in order to bring about a defined establishing of the locking position of the sleeve.

In a further exemplary embodiment it is also possible for the sleeve to be designed as such and to have one or more carriers such that the door can be moved both from the first oblique position in the direction of the fully closed position in order to establish the locking position of the sleeve or can optionally be moved into a position in the direction of the fully opened position, the automatic establishing of the locking position of the sleeve then also being reached.

The bearing element of the door can be arranged in particular on a lower region of a side edge of the door leaf of the door. In particular one bearing element can be arranged respectively on the opposing lower regions of the opposing edges of the door leaf.

In one exemplary embodiment provision can be made for the sleeve to be fixed in an azimuthal direction about the rotation axis by a fixing apparatus of the cooking appliance in the locking position. This also maintains the defined locking position. It prevents unwanted easy twisting of the sleeve about the rotation axis, which would readjust the locking position. The fixing apparatus can be a snap-fit connection for example. A snap-fit element can snap into a snap-fit element holder in a radial direction to the rotation axis for this purpose. The snap-fit element can be for example a spring element or a resilient plastic web or a metal resilient web or a spring-pretensioned sphere or the like.

In one exemplary embodiment the door can be a folding door. This means that it is only arranged pivotably on a housing of the cooking appliance. The relevant pivot axis can be oriented in the widthwise direction of the door. It can however be arranged in a fixed position. This means that the door can only perform one pivoting movement.

In a further exemplary embodiment the cooking appliance can have a pivotable door. To this end in one exemplary embodiment the cooking appliance has a stowage space. This can be configured in the housing. It can be configured in particular in a heightwise direction below the cooking chamber. It can be separated from the cooking chamber by at least one separating wall. The stowage space is provided to receive the door as required, when the door is introduced into the housing as it opens. The guide apparatus can be configured to guide the door as it is moved into the stowage space and/or as it is moved out of the stowage space.

In one exemplary embodiment the guide apparatus can have an engagement region. The carrier can extend into this as required when viewed in the widthwise direction of the cooking appliance. In the depthwise direction of the cooking appliance the engagement region can be delimited to the rear by a boundary wall. The boundary wall can form a defined fixed stop for the carrier. In particular this is a carrier oriented axially in the direction of the rotation axis of the sleeve. The carrier comes up against the stop as the door enters the stowage space, so that, as the door is pushed further into the stowage space, the sleeve can be rotated automatically about a rotation axis into the locking position. As the boundary wall can be arranged in particular in a fixed position, this corresponding movement scenario of the sleeve is generated automatically when the carrier comes up against the stop.

A further aspect of the invention relates to a method for fitting a door of a cooking appliance. The cooking appliance is configured in particular according to the abovementioned aspect or an advantageous exemplary embodiment thereof. The method comprises the following steps:

- establishing a coupling fitting position of the door in relation to the guide apparatus;
- rotating a sleeve of a locking apparatus into a first rotational position for establishing an unlocking position of the locking apparatus;
- inserting a bearing element on the door into a door-distal holder of the locking apparatus; and
- moving the door out of a first oblique position, which is held by the door in the coupling fitting position, into a different position, thereby causing the sleeve to rotate automatically from the unlocking position to a locking position and establishing a locked state of the locking apparatus.

In a further exemplary embodiment the sleeve can be configured or produced as a single piece. In this respect it can be made from a single material, for example metal. In one exemplary embodiment however it can be configured from a number of different materials. For example the sleeve can have an outer sleeve made of a first material and at least partially an inner sleeve made of a different material. The outer sleeve can be made of metal for example. This means that at least the outer sleeve is mechanically very stable. The inner sleeve can be arranged directly on the outer sleeve. For example it can be applied using adhesive or by injection or in some other manner so that it cannot be removed without being destroyed. The inner sleeve can be made of plastic for example. It can be a type of plastic for example that has a greater ability to slide than the material of the outer sleeve. It is also possible for the outer ring or outer sleeve and the inner ring or inner sleeve each to be produced as separate components. In particular they can each be produced as single-piece parts. They can be connected in such a manner that they can be released non-destructively, for example by means of a plug-type connection or a snap-fit connection. In such an exemplary embodiment one of the two separate rings or sleeves can be removed again from the other and replaced for example if worn.

When the sleeve, in particular an outer sleeve, is made of metal, it can be made of steel sheet for example.

The terms "top", "bottom", "front", "rear", "horizontal", "vertical", "depthwise direction", "widthwise direction", "heightwise direction", etc. refer to the positions and orientations resulting when the appliance is used and arranged in the correct manner.

Further features of the invention will emerge from the claims, figures and description of the figures. The features and feature combinations cited above in the description as well as the features and feature combinations cited in the following in the description of the figures and/or shown in the figures alone can be used not only in the respectively cited combination but also in other combinations, without departing from the scope of the invention. Therefore embodiments of the invention which are not specifically described and illustrated in the figures but will emerge and can be generated from the described embodiments as a result of separate feature combinations are also deemed to be covered and disclosed by the invention. Embodiments and feature combinations which do not therefore have all the features of an originally formulated independent claim should also be deemed to be disclosed. Embodiments and feature combinations, which go beyond or deviate from the feature combinations set out in the claim references, should also be deemed to be disclosed, in particular as a result of the embodiments set out above.

BRIEF DESCRIPTION OF THE DRAWINGS

Exemplary embodiments of the invention are described in more detail below with reference to schematic drawings, in which.

DETAILED DESCRIPTION OF EXEMPLARY EMBODIMENTS OF THE PRESENT INVENTION

Figure 1:
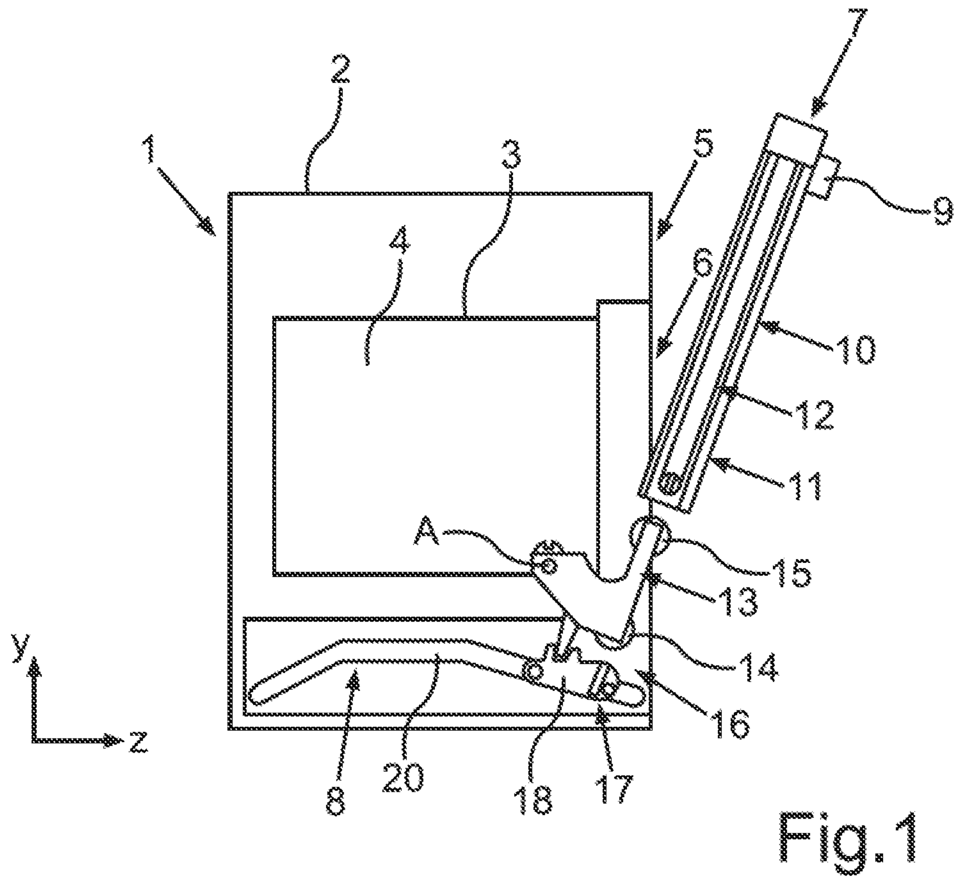
FIG. 1 shows a perspective view of an exemplary embodiment of an inventive cooking appliance.

Identical elements or those of identical function are shown with identical reference characters in the figures.

FIG. 1 shows a schematic view of an exemplary embodiment of a cooking appliance 1. The cooking appliance 1 can be for example an oven or a steam cooking appliance or a microwave appliance. The cooking appliance 1 has a housing 2. Arranged in the housing 2 is a muffle 3. Arranged in the housing 2 is a cooking chamber 4. This is delimited in particular by the walls of the muffle 3. The cooking appliance 1 has a front face 5. Configured on the front face 5 is a loading opening 6, through which the cooking chamber 4 can be accessed. The cooking appliance 1 also has a door 7. The door 7 is arranged so that it can close the cooking chamber 4.

In one exemplary embodiment the door 7 can be a simple folding door. This means that it is arranged pivotably on the housing 2. A relevant pivot axis then runs in a widthwise direction (x-direction) of the cooking appliance 1. The widthwise direction is oriented perpendicular to the plane of the figure.

In the exemplary embodiment shown in FIG. 1 the door 7 is a pivotable door. This means that it can be pushed into a stowage space 8 of the cooking appliance 1 when the door 7 is opened. The stowage space 8 is a separate space from the cooking chamber 4. It is arranged below the cooking chamber 4 when viewed in the heightwise direction (y-direction) of the cooking appliance 1. It is separated from the cooking chamber 4. The door 4 is shown from the side in FIG. 1. It can have a handle 9. The handle 9 can be fixed or rotatable. The door 7 also has a door leaf 10. The door leaf 10 can comprise a number of separate door panels. A front panel and an inner panel can then be provided. These are oriented parallel to and some distance from one another. The panel arrangement of the door leaf 10 can also comprise at least one intermediate panel. These at least two separate panels are kept apart by door profiles. FIG. 1 only shows one door profile 11 for the sake of simplicity. When viewed in a widthwise direction a door profile 11 is a support structure arranged on the left or right side, being configured as a profiled bar oriented in a heightwise direction. In one exemplary embodiment a guide path 12 can also be configured in such a door profile. This is open to the side and therefore in the widthwise direction. A hinge part 13 of a hinge can engage in the guide path 12, in particular with rollers 14 and 15. The hinge part 13, shown here in an exploded view with the other components, can be pivoted for example about a hinge axis A perpendicular to the plane of the figure. The door leaf 10 or door 7 can be moved relative to the hinge part 13. This means that, when the door 7 is opened for example, the rollers 14 and 15 slide along in the guide path 12 allowing the door 7 to be pivoted about a pivot axis horizontal to the plane of the figure and then also to be inserted into the stowage space 8 in the exemplary embodiment shown.

Figure 4:
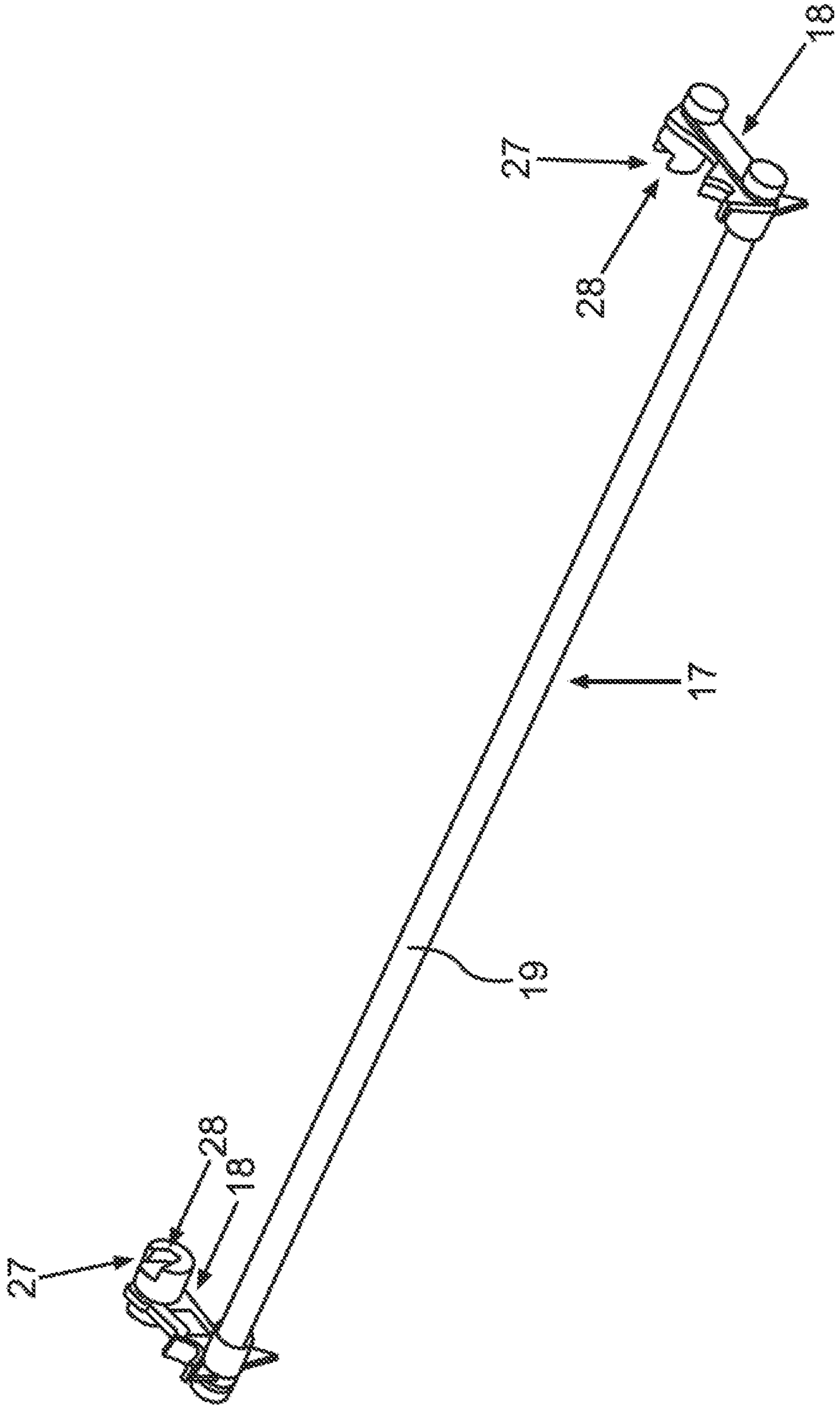
FIG. 4 shows a schematic view of sub-components of a guide apparatus for guiding the door.

The cooking appliance 1 also has a guide apparatus 16. The guide apparatus 16 is configured outside the door. On a folding door the guide apparatus 16 can be arranged in a fixed position for example and have just one corresponding pivot hinge, which can be coupled to a corresponding part of the door 7, without allowing a corresponding pivot movement. In the exemplary embodiment shown in FIG. 1, in which the door 7 is a pivotable door, the guide apparatus 16 also has a guide carriage 17. The guide carriage 17 has opposing guide jaws 18. These are connected by a connecting rod 19 (FIG. 4). The guide jaws 18 can have sliding elements or roller elements. The carriage 17 uses these to engage directly in opposing guide paths 20 (FIG. 1). These are configured on opposing side boundary walls delimiting the stowage space 8. The guide carriage 17 of the guide apparatus 16 can therefore be arranged so that it can be displaced correspondingly. In contrast the hinge part 13 can be arranged in a fixed position so that it can only be pivoted about the pivot axis A. Opposing hinge parts 13 are also configured here, engaging in opposing guide paths 12, which are configured on edge faces of the door leaf 10.

Figure 2:
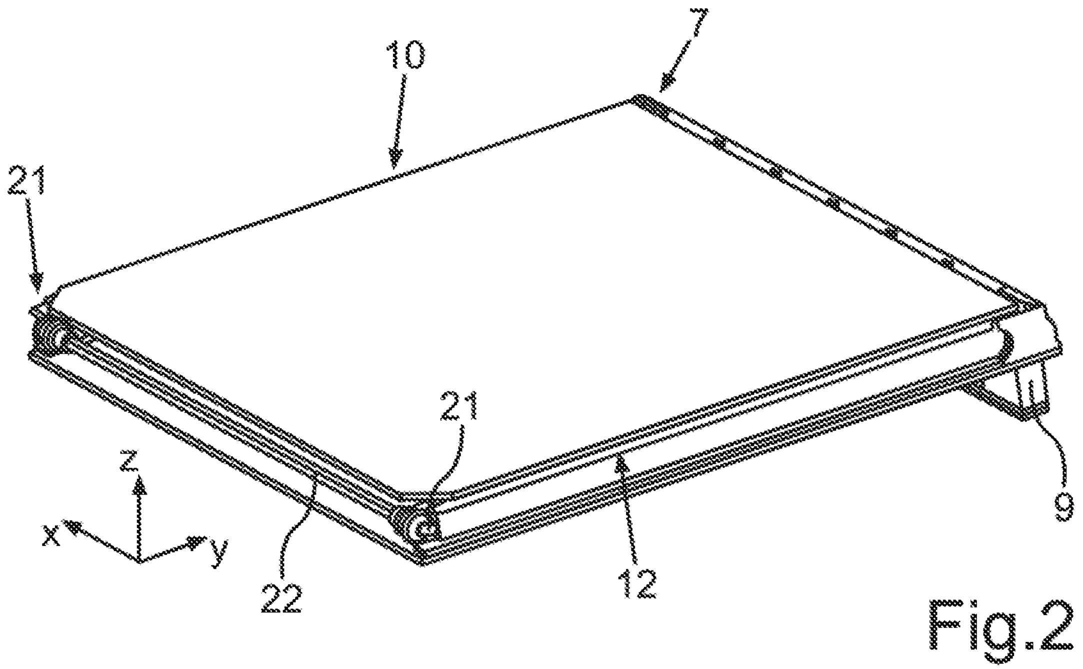
FIG. 2 shows a schematic perspective view of an exemplary embodiment of the door of the cooking appliance according to FIG. 1.

FIG. 2 shows a schematic perspective view of the door 7. The door 7 has a bearing element 21 in a lower region. The bearing element 21, which is arranged on the door, is positioned in particular in a fixed position on the door leaf 10. In one exemplary embodiment the bearing element 21 is connected to a connecting rod 22 on the door 7. On the side opposite in the widthwise direction (x-direction) the door 7 has a further bearing element 21. The bearing element 21 can be for example a bearing pin projecting outward in a widthwise direction. It can be formed in a cuboid manner for example. The bearing elements 21 are arranged on opposing lower corner regions of the edge faces of the door leaf 10.

Figure 3:
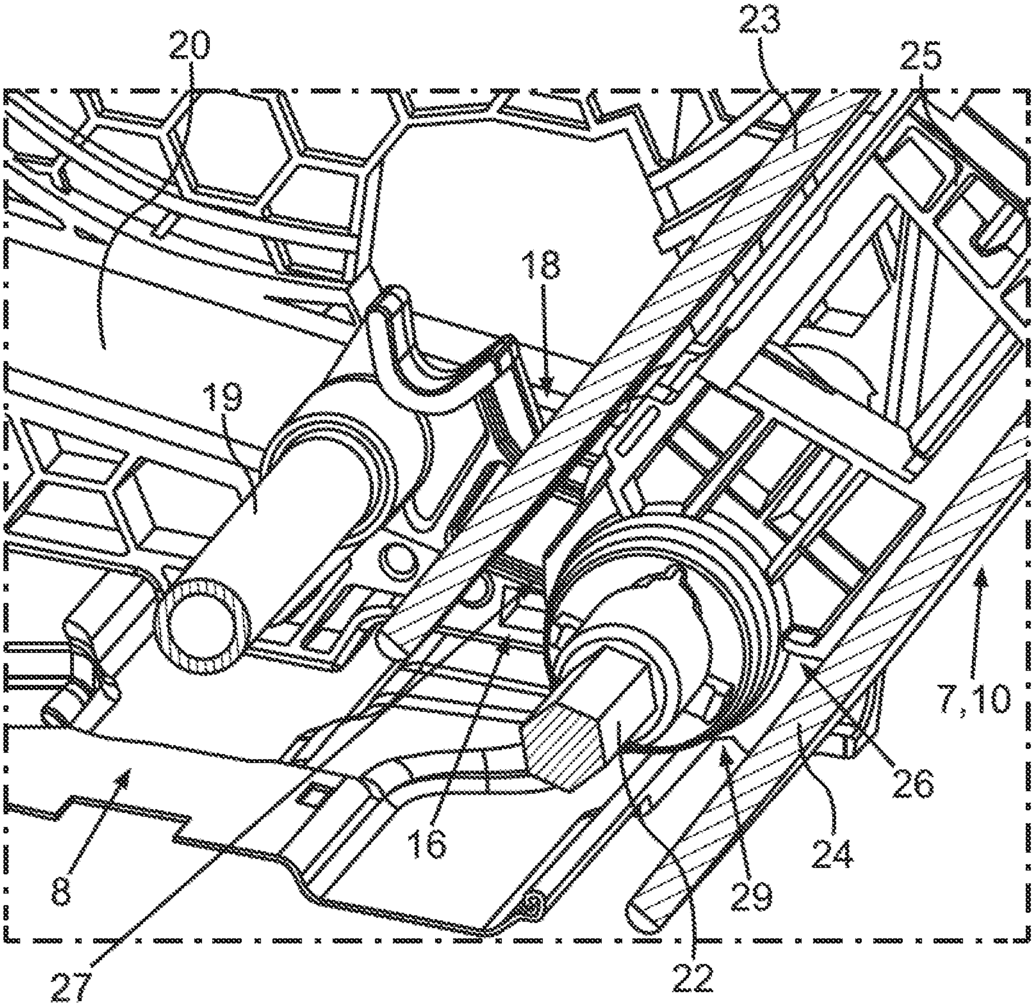
FIG. 3 shows a perspective sectional view through a sub-region of the cooking appliance according to FIG. 1 with a door in a coupling fitting position and with a guide apparatus of the cooking appliance.

FIG. 1 shows the state, in which the door 7 is decoupled from the guide apparatus 16. In contrast FIG. 3 shows a perspective sectional view of a partial detail of the cooking appliance 1. The coupled state between the door 7 and the guide apparatus 16 is shown here. The sectional plane here is spanned by the heightwise direction and the depthwise direction (z-direction). It also shows an inner panel 23 and a front panel 24 of the door leaf 10 by way of example. A further door profile 25 is also shown as a panel support. Two parallel door profiles 11 and 25 are therefore present.

FIG. 3 also shows a state, in which the door 7 is coupled to the guide apparatus 16. The cooking appliance 1 has a coupling facility 26 for this purpose.

As also shown in FIG. 4, a guide jaw 18 has a bearing support 27. This is configured correspondingly for the corresponding opposing carriage jaws 18. The bearing support 27 has a holder 28. This can be a channel or groove. The holder 28 is provided as required in each instance to receive the opposing bearing elements 21. The bearing support 27 with the holder 28 is also part of a locking apparatus 29 of the cooking appliance 1.

Figure 5:
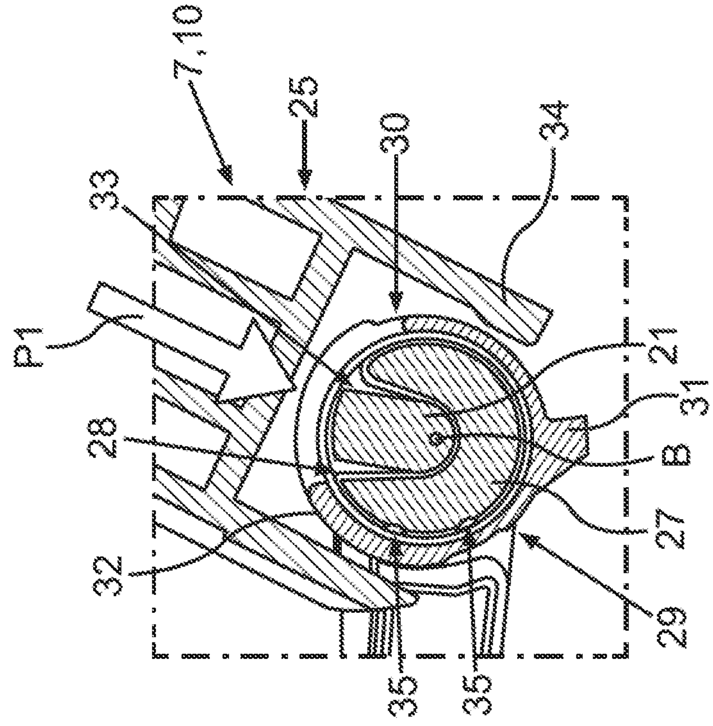
FIG. 5 shows a sectional view of sub-components of the door, a guide apparatus and a locking apparatus of the cooking appliance with the door in the coupling fitting position and a sleeve of the locking apparatus in an unlocking position.

FIG. 5 shows a detail of the cooking appliance 1 in the region of the locking apparatus 29. A view from the outside is shown looked at in the widthwise direction. In this respect it is similar to the view shown in FIG. 1. FIG. 3 in contrast shows a sectional view, in which the view is as it were outward from inside. FIG. 5 is therefore a view from the opposite side to FIG. 3. FIG. 5 also shows a sectional view, which therefore looks inward from outside rather than outward from inside.

As shown here, the bearing element 21 is already inserted into the holder 28. This state is achieved by arranging the door 7 in a coupling fitting position, The coupling fitting position is a first oblique position. The first oblique position is however different from the fully closed position of the door and also different from the fully opened position of the door. FIG. 5 shows a first oblique position of the door 7. As shown by the arrow P1, in this oblique position, as also shown in FIG. 1, a coupling takes place between the door 7 and the guide apparatus 16. To this end the bearing element 21 is inserted linearly into the holder 28 according to the arrow direction P1.

In the exemplary embodiment shown the locking apparatus 29 also has a sleeve 30. This can also be referred to as a ring. The sleeve 30 is a separate part. It is arranged rotatably directly on the bearing support 27. It therefore engages peripherally around the bearing support 27. The rotation axis B of the sleeve 30 is oriented perpendicular to the plane of the figure. The rotation axis B is advantageously also arranged coaxially to the pivot axis of the door 7. As also shown in FIG. 5, the sleeve 30 has at least one carrier 31. The carrier 31 is molded on an outer face of a circumferential wall 32 of the sleeve 30. It projects radially outward therefrom. The carrier 31 is configured as a single piece with the sleeve 30. The sleeve 30 can be rotated relative to the bearing support 27. The sleeve 30 is secured axially on the bearing support 27. This means that it is arranged in a secured position on the bearing support 27 in the direction of the rotation axis B. A snap-fit connection or the like can be provided here for example.

The bearing sleeve 30 can be arranged rotatably on the bearing support 27 in at least two different rotational positions relative thereto. A first rotational position here is defined by an unlocking position of the locking apparatus 29. In the unlocking position the holder 28 is uncovered in a radial direction. To this end an entrance or opening 33 in the holder 28 is radially open. An opening 33 is therefore configured at a radially outer end of the holder 28 and is freely accessible in the unlocking position of the sleeve 30. The unlocking position of the sleeve 30 is established in the unfitted state between the door 7 and the guide apparatus 16. This allows the bearing element 21 to be inserted without obstruction by way of the opening and the corresponding opening 33 into the holder 28 during corresponding coupling.

As also shown in FIG. 5, in the coupling fitting position the door 7 is also some distance from the carrier 31.

In order now to secure and lock the coupled state between the bearing element 21 and the holder 28, provision is made for further movement of the door 7.

Figure 6:
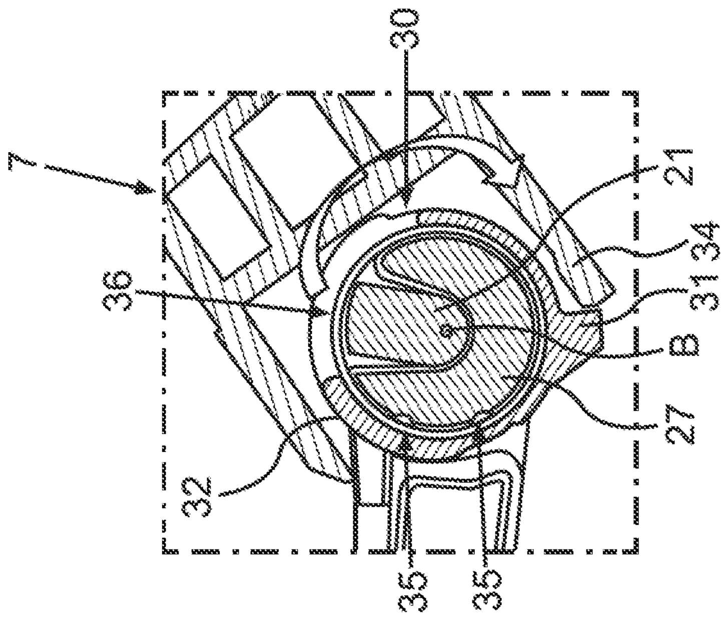
FIG. 6 shows the view according to FIG. 5 with the door in a second oblique position and with a contact element of the door in a contacting position with a carrier of the sleeve.

To this end, starting from the view in FIG. 5, in a further exemplary embodiment the door 7 is moved into a second oblique position that is different from the first oblique position. In an exemplary embodiment according to FIG. 6 the second oblique position can be such that it is close to the fully opened position. The door 5 is therefore opened or pivoted further from the first oblique position. This causes a contact element 34 of the door 7 to come into contact with the carrier 31, as shown in FIG. 6. FIG. 6 therefore shows the second pivot position of the door 7, representing mechanical contact between the contact element 34 and the carrier 31. As also shown in FIG. 5 and FIG. 6, in one exemplary embodiment the locking apparatus 29 has a fixing apparatus 35. The fixing apparatus 35 can fix or maintain the unlocking position of the sleeve 30 azimuthally about the rotation axis A. In a further exemplary embodiment it is possible additionally or instead for a locking position of the sleeve 30 to be fixed by the fixing apparatus 35. In one exemplary embodiment the fixing apparatus 35 has radially acting snap-fit connections. To this end a snap-fit element, which is configured on the inner face of the sleeve 30, can snap into snap-fit holders, which are configured on the outer face of the bearing support 27.

Figure 7:
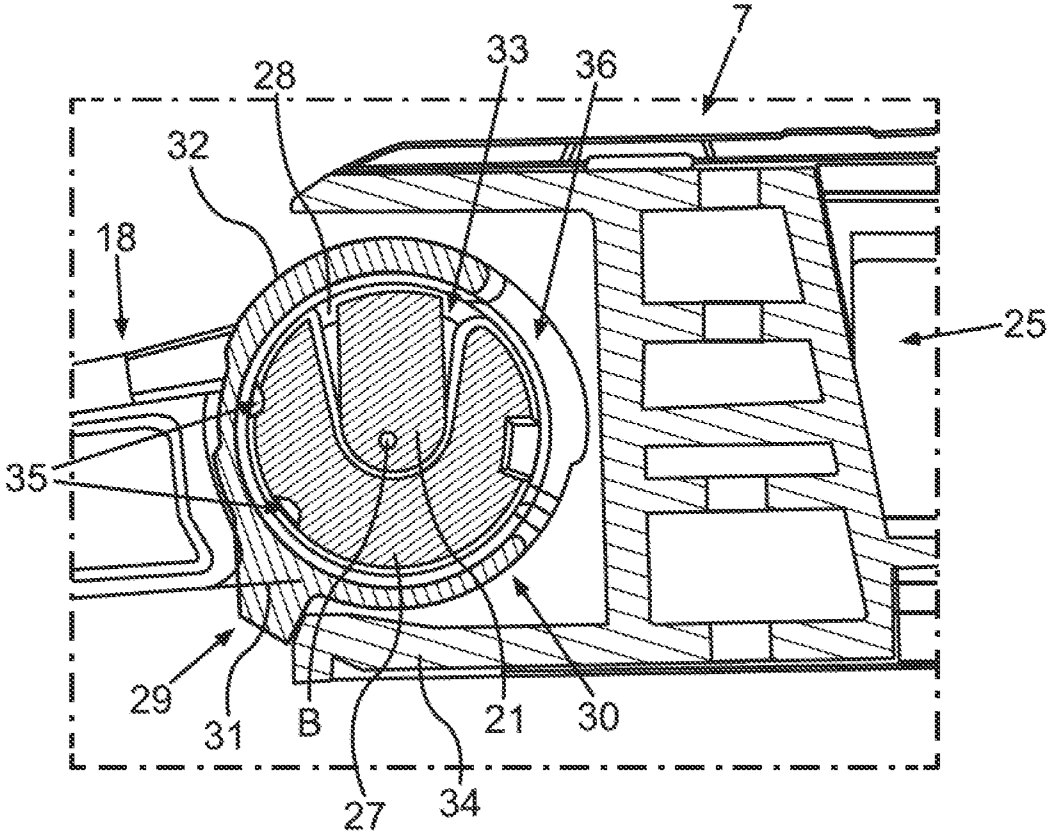
FIG. 7 shows a sectional view according to FIG. 5 and FIG. 6, in which the sleeve is arranged in the locking position.

From the position of the door 7 in FIG. 6, if the door 7 is pivoted further toward to the full opened position, the directly contacted state between the contact element 34 and the carrier 31 can cause the sleeve 30 to rotate automatically about the rotation axis B. This brings about a relative movement of the sleeve 30 relative to the bearing support 27. This twists the sleeve 30 so that the locking position is established. This means that the circumferential wall 32 of the sleeve 30 is displaced about the rotation axis B such that the holder 28 is closed radially. This results in locking so that the bearing element 21 can no longer be pulled out of the holder 28 by way of the opening 33 in the radial direction. It can therefore be seen in FIG. 7 that a partially circumferential cutout 36 on the circumferential wall 32 is rotated further about the rotation axis B in the circumferential direction so that it is arranged outside the opening width of the holder 28 in an azimuthal direction. As also shown in FIG. 7, the snap-fit element of the fixing apparatus 35 has left the first snap-fit element holder on the outer face of the bearing support 27 and has snapped into the azimuthally further snap-fit holder in the locking position of the sleeve 30 shown in FIG. 7. This means that the locking position is also fixed in an advantageous exemplary embodiment.

In one exemplary embodiment provision is made for the sleeve to be in such a rotational position in the locking position that the carrier 31 in particular is again some distance from the contact element 34. As in the exemplary embodiment shown the locking position is preferably rotated so far that the rotational position is beyond the position, in which the door 7 reaches the fully opened position, it is also possible to prevent further force action on the sleeve 30 causing damage to it. The locking position is therefore advantageously formed about the rotation axis B in the circumferential direction so that the door 7 has reached the maximum opened position in respect of its pivot position. Further pivoting is no longer provided for or possible, so no further azimuthal pivot force can be exerted on the sleeve 30 and in particular on the carrier 31.

In one preferred exemplary embodiment provision is made for the locking position of the sleeve 30 to be a rotation angle greater than 1°, in particular between 3° and 7°, in particular 5° further in the direction of the pivot direction of the door 7 than a door 7 that is pivoted to the maximum. Provision can be made for the coupling element 34 to carry the sleeve 31 along up to the fully pivoted position of the door 7 and the subsequent rotational movement of the sleeve to the locking position to be performed independently. For example this residual rotation of the sleeve 30 can be achieved automatically by a correspondingly configured snap-fit connection. This prevents a situation in which the door 7 strikes the sleeve 30 and damages it or pushes it out of the locking position during subsequent opening and closing of the door 7. The same provision can be made in an exemplary embodiment, which is based on FIG. 8 so that the fully closed position of the door 7 is relevant.

Figure 8:
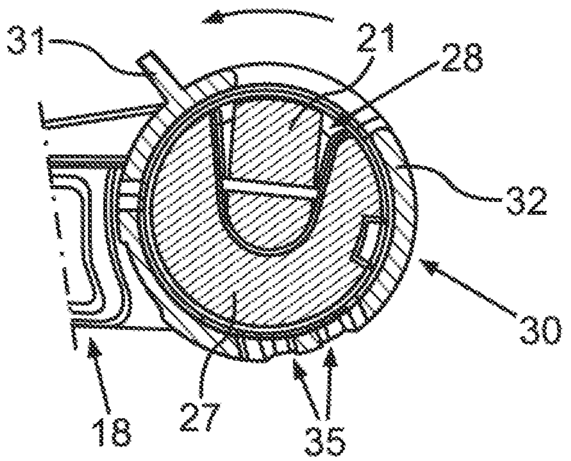
FIG. 8 shows a view according to FIG. 5, showing an exemplary embodiment of a corresponding sleeve of the locking apparatus that is different from FIG. 5.

FIG. 8 shows a further exemplary embodiment as an alternative to the preceding drawings. In contrast to FIG. 5 to FIG. 7 provision can be made here for the carrier 31 to be arranged and be radially distanced from the outer face of the circumferential wall 32 so that from the coupling fitting position of the door 7 shown in FIG. 5 the second oblique position is toward the fully closed position of the door 7. In contrast to FIG. 6 and FIG. 7 therefore a movement of the door 7 is required from the coupling fitting position shown in FIG. 5 toward the fully closed position of the door 7, in order to make contact with the relevant carrier 31 and then move toward the closed position when moved further and thus to bring about the automatic establishing of the locking position of the sleeve 30.

Figure 9:
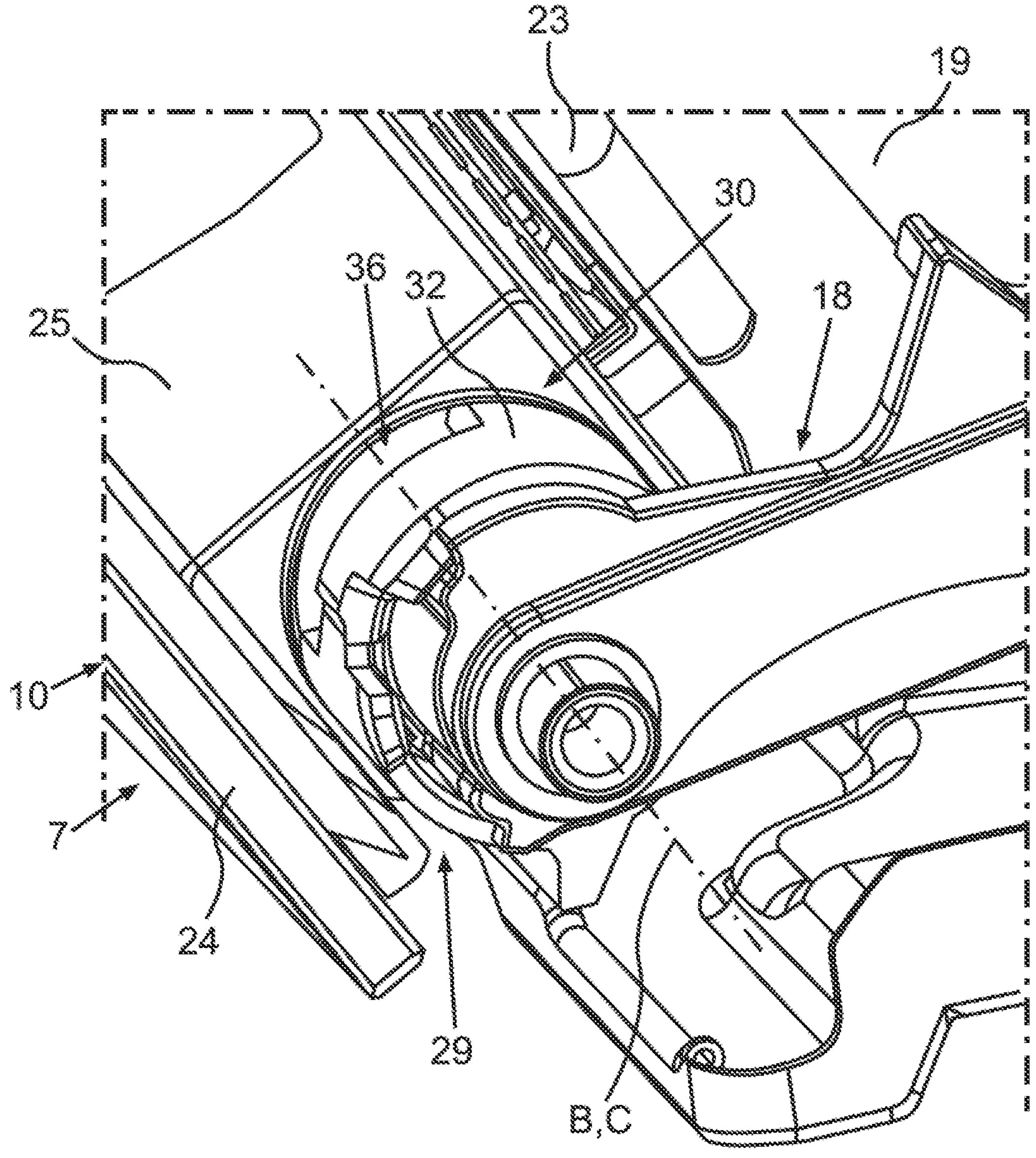
FIG. 9 shows a perspective view of the embodiment in FIG. 5.

FIG. 9 shows a perspective view of the embodiment in FIG. 5. The cutout 36 in the circumferential wall 32 is clearly shown. Also shown here are the rotation axis B and the pivot axis C of the door 7, which is oriented coaxially thereto here.

Figure 10:
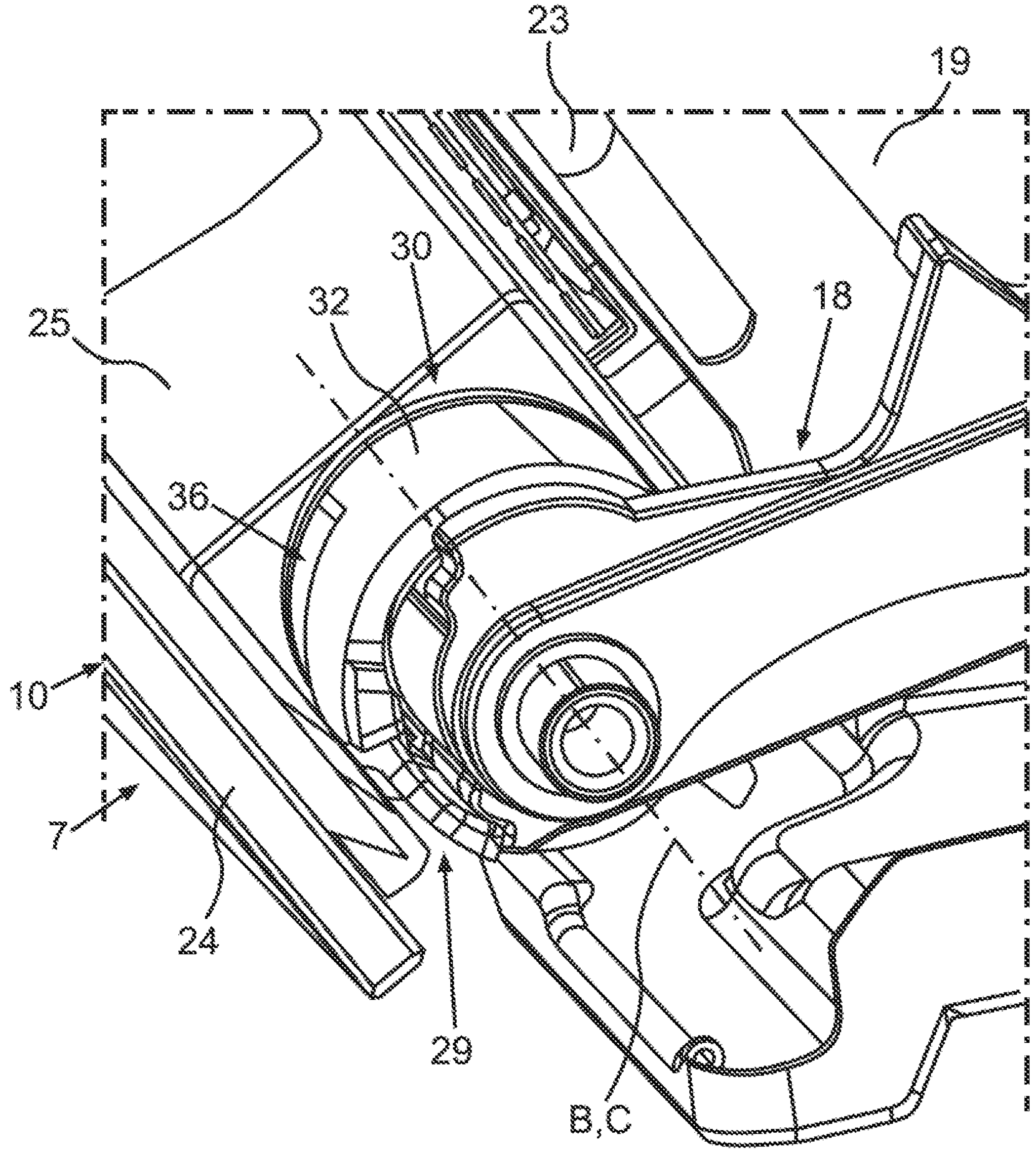
FIG. 10 shows a perspective view of FIG. 9 with the sleeve in the locking position according to FIG. 7.

FIG. 10 shows the corresponding perspective view of the components but with the sleeve 30 in the locking position.

If the locking position is established after fitting, the sleeve 30 remains in the locking position, even if the door 7 is subsequently pivoted to and fro between the fully closed position and the fully opened position. Cancellation of the locking position of the sleeve 30 can be brought about in particular manually by a user. To this end the user can grip the sleeve 30 on the outside and twist it about the rotation axis B so that the unlocking position is established again. The door 7 can then be removed and thus decoupled from the guide apparatus 16 when the door 7 takes up the defined coupling fitting position and thus the first oblique position.

Figure 11:
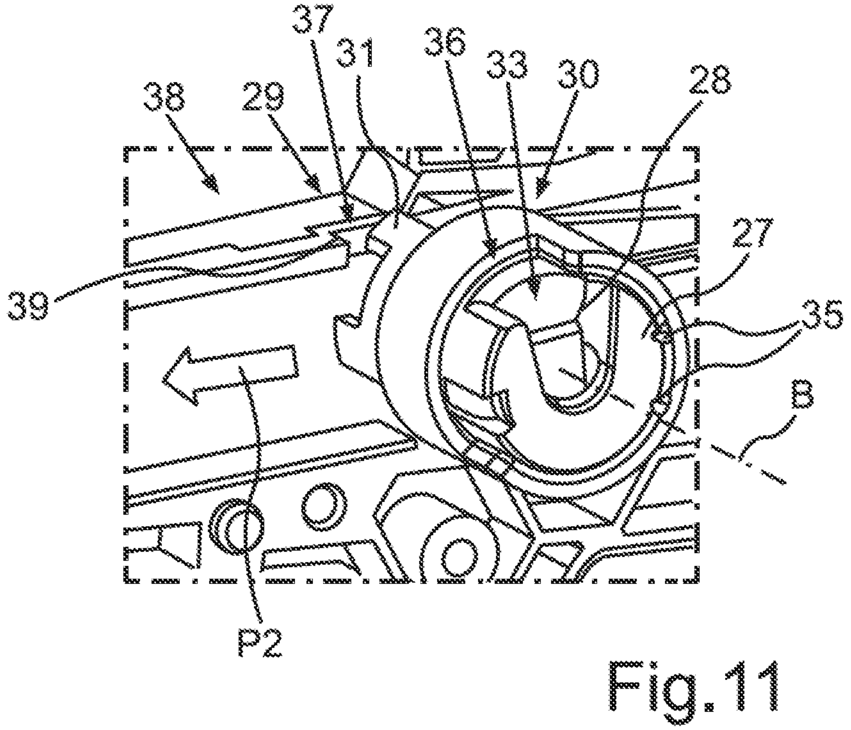
FIG. 11 shows a perspective view of a further exemplary embodiment of a cooking appliance with a sleeve that is different from previous views and a similarly different embodiment of a locking apparatus.

FIG. 11 shows a perspective partial view of a further exemplary embodiment of the locking apparatus 29. In contrast to the preceding exemplary embodiment the sleeve 30 here does not have at least one radially projecting carrier 31. Instead at least one axial carrier 31 is provided here in the direction of the longitudinal axis of the sleeve 30 and therefore also the rotation axis B. This engages in a coupling element 37. The coupling element 37 here is a holder or a recess in a guide part 38 of the guide apparatus 16 formed in a widthwise direction. This results in a stepped stop, against which the carrier 31 strikes on the movement path in the depthwise direction. In particular the recess delimits a holder in a side wall, which delimits the stowage space 8. In particular the recess is configured in the region of the guide path 20. This exemplary embodiment is preferably provided for a lowerable door 7, as it is necessary in particular here that the door 7 is not only pivoted but in particular that it is also moved linearly into the stowage space 8, as shown by the arrow P2. Also the overlap provided in the widthwise direction of the cooking appliance 1 between the axially oriented carrier 31 and the recess causes the door 7 to be moved further from its specific first oblique position and be lowered into the stowage space 8. In this process the carrier 31 also moves relative to the recess in the depthwise direction (z-direction) of the cooking appliance 1. This continues until it strikes a boundary wall 39, which delimits the recess to the rear in the depthwise direction. After this stop and a further movement of the door 7 in direction P2 the sleeve 30 is rotated about its rotation axis B until the locking position is established again. To this end the opening 33 in the holder 28 of the bearing support 27 is locked or blocked again. The bearing element 21 (not shown here) is then secured or locked so that it cannot slide radially out of the holder 28.

This position of the sleeve 30 is then also permanently maintained. In particular it is also fixed by the fixing apparatus 35. The locking position can also be cancelled manually here for example by a user, by corresponding twisting about the rotation axis B.

Figure 12:
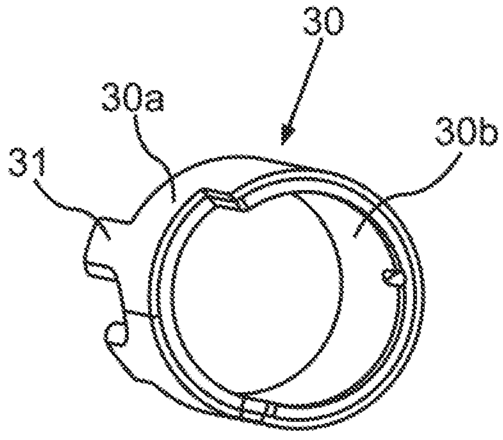
FIG. 12 shows perspective views of further exemplary embodiments of a sleeve of a locking apparatus.

FIG. 12 shows a perspective view of a further exemplary embodiment of a sleeve 30. The sleeve 30 here is not configured as a single piece from one material. Instead an outer sleeve 30*a* can be provided. This can be configured as a single piece from one material, for example metal. In the exemplary embodiment shown the sleeve 30 also comprises an inner sleeve 30*b*. This is made in particular from a different material from the outer sleeve 30*a*. It can be made of plastic for example. In particular a material is provided here, which has a greater ability to slide than the material of the outer sleeve 30*a*. For example the material of the inner sleeve 30*b* can be sprayed onto the inner face of the outer sleeve 30*a*. The sleeve 30 according to FIG. 12 is shown according to the exemplary embodiment in FIG. 11. The at least one carrier 31 is oriented axially. The embodiment according to FIG. 12 with the inner sleeve 30*b* and the outer sleeve 30*a* can however also be configured with the radially projecting carrier 31 in the exemplary embodiment.

What is claimed is:

1. A cooking appliance, comprising:

a housing;

a cooking chamber configured in the housing;

a door for closing the cooking chamber;

a guide apparatus for guiding the door as the door is moved; and a coupling facility coupling the door to the guide apparatus, said coupling facility comprising a locking apparatus configured to lock a coupled state between the door and the guide apparatus and including a bearing support with a holder, in which in the coupled state a bearing element, which is arranged on the door, engages, said locking apparatus including a door-distal tubular sleeve supported on the bearing support for rotation into a first rotational position in which in the coupled state an unlocking position is established between the sleeve and the bearing element, and into a second rotational position in which in the coupled state a locking position is established between the sleeve and the bearing element, said sleeve including a carrier configured in one of two ways, a first way in which the carrier automatically contacts a contact element of the door when the door is moved, and causes upon further movement of the door to dynamically couple the sleeve to the door and to automatically rotate the sleeve from the unlocking position to the locking position, a second way in which the carrier automatically contacts a contact element of the guide apparatus when the door is moved, and causes upon further movement of the door to automatically rotate the sleeve from the unlocking position to the locking position when the door moves relative to a coupling element of the guide apparatus.

2. The cooking appliance of claim 1, wherein the carrier is arranged in a movement path of the door so that when the door pivots, the carrier is automatically brought into contact with the contact element of the door, and when the door pivots further, the sleeve is dynamically coupled to the door and the sleeve is rotated automatically from the unlocking position to the locking position.

3. The cooking appliance of claim 1, wherein the sleeve includes a circumferential wall having an outer face and running around a rotation axis of the sleeve, said carrier extending radially outward from the circumferential wall.

4. The cooking appliance of claim 3, wherein the carrier is oriented such as to cantilever freely.

5. The cooking appliance of claim 1, wherein the sleeve includes a circumferential wall having an outer face and running around a rotation axis of the sleeve, said carrier extending axially from the circumferential wall.

6. The cooking appliance of claim 5, wherein the carrier is oriented such as to cantilever freely.

7. The cooking appliance of claim 1, wherein the sleeve is supported for rotation about a rotation axis relative to the bearing element and extends parallel or coaxial to a pivot axis, about which the door is rotatable relative to the guide apparatus.

8. The cooking appliance of claim 1, wherein the holder in the bearing support has a radial opening at a radially outer end thereof for insertion of the bearing element into the holder.

9. The cooking appliance of claim 8, wherein the sleeve has a circumferential wall, in which an only partially circumferential cutout is configured and arranged in the locking position in a same location as the opening when viewed in an azimuthal direction about a rotation axis of the sleeve, so that the opening is uncovered in a radial direction.

10. The cooking appliance of claim 8, wherein the sleeve has a circumferential wall, in which an only partially circumferential cutout is configured and arranged in the locking position with an offset from the opening when viewed in an azimuthal direction about a rotation axis of the sleeve, so that the opening is closed by the circumferential wall in a radial direction and the bearing element is locked in the holder to prevent the bearing element moving radially out of the opening.

11. The cooking appliance of claim 1, wherein the bearing element is arranged in a fixed position on the door, so that to couple the door to the guide apparatus insertion of the bearing element is only possible in a first oblique position of the door as a coupling fitting position, with the coupling fitting position being different from a fully opened position of the door and different from a fully closed position of the door, said door being arranged in the coupling fitting position at a distance from the carrier in an azimuthal direction about a rotation axis of the sleeve.

12. The cooking appliance of claim 11, wherein the contact element of the door is arranged in the coupling fitting position at a distance from the carrier in the azimuthal direction about the rotation axis of the sleeve.

13. The cooking appliance of claim 11, wherein a contact position of the door, which contact position is different from the first oblique position and in which the carrier has just been brought into mechanical contact with the contact element, is a position that is different from the fully opened position of the door and different from the fully closed position of the door.

14. The cooking appliance of claim 13, wherein the contact position is a second oblique position, in which the door is opened further in relation to a vertical than in the first oblique position or the door is opened less far in relation to the vertical than in the first oblique position.

15. The cooking appliance of claim 1, further comprising a fixing apparatus configured to fix the sleeve in an azimuthal direction about a rotation axis at least in the locking position.

16. The cooking appliance of claim 1, wherein the housing has a stowage space for receiving the door, when the door is introduced into the housing as the door opens, said guide apparatus being configured to guide the door as the door is moved into the stowage space or as the door is moved out of the stowage space.

17. The cooking appliance of claim 16, wherein the guide apparatus has an engagement region, into which the carrier extends when viewed in a widthwise direction of the cooking appliance, said coupling element of the guide apparatus having a boundary wall configured to form a stop against which the carrier strikes as the door is inserted into the stowage space, so that when the door is pushed further into the stowage space, the sleeve is rotatable automatically into the locking position about a rotation axis of the sleeve.

18. A method for fitting a door of a cooking appliance on a guide apparatus of the cooking appliance, said method comprising:

establishing a coupling fitting position of the door in relation to the guide apparatus;

rotating a sleeve of a locking apparatus, which is configured to lock a coupled state between the door and the guide apparatus, into a first rotational position for establishing an unlocking position of the locking apparatus;

inserting a bearing element on the door into a door-distal tubular sleeve of the locking apparatus; and moving the door out of a first oblique position, which is held by the door in the coupling fitting position, into a different position, thereby causing the sleeve to rotate automatically from the unlocking position to a locking position and establishing a locked state of the locking apparatus.

* * * * *